US012352089B2

(12) United States Patent
Ran et al.

(10) Patent No.: US 12,352,089 B2
(45) Date of Patent: Jul. 8, 2025

(54) DOOR HINGE

(71) Applicant: GUANGDONG MINGMEN LOCKS INDUSTRY CO., LTD., Guangdong (CN)

(72) Inventors: Guangrui Ran, Guangdong (CN); Qian Xiao, Guangdong (CN); Zengrong Xie, Guangdong (CN); Hailong Tang, Guangdong (CN)

(73) Assignee: GUANGDONG MINGMEN LOCKS INDUSTRY CO., LTD., Zhongshan (CN)

( * ) Notice: Subject to any disclaimer, the term of this patent is extended or adjusted under 35 U.S.C. 154(b) by 0 days.

(21) Appl. No.: 18/264,914

(22) PCT Filed: Oct. 22, 2021

(86) PCT No.: PCT/CN2021/125701
§ 371 (c)(1),
(2) Date: Aug. 9, 2023

(87) PCT Pub. No.: WO2022/170786
PCT Pub. Date: Aug. 18, 2022

(65) Prior Publication Data

US 2024/0110421 A1 Apr. 4, 2024

(30) Foreign Application Priority Data

Feb. 9, 2021 (CN) ......................... 202110178381.2
Jul. 9, 2021 (CN) ......................... 202110779820.5

(51) Int. Cl.
*E05F 1/08* (2006.01)
*E05F 1/12* (2006.01)
*E05F 3/20* (2006.01)

(52) U.S. Cl.
CPC .............. *E05F 1/1207* (2013.01); *E05F 3/20* (2013.01); *E05Y 2201/638* (2013.01);
(Continued)

(58) Field of Classification Search
CPC .... E05D 3/06; E05D 3/12; E05D 3/14; E05D 3/142; E05D 3/16; E05D 3/125;
(Continued)

(56) References Cited

U.S. PATENT DOCUMENTS 2,437,192 A * 3/1948 Glanz ........................ E05F 3/20 16/50
4,083,082 A * 4/1978 Holmes ................... E05D 3/142 16/303

(Continued)

FOREIGN PATENT DOCUMENTS

CN 102071857 A * 5/2011
CN 201915744 U 8/2011

(Continued)

OTHER PUBLICATIONS

International Search Report from International Application No. PCT/CN2021/125701 mailed Jan. 20, 2022.

*Primary Examiner* — Chuck Y Mah
(74) *Attorney, Agent, or Firm* — Shih IP Law Group, PLLC

(57) ABSTRACT

Disclosed is a door hinge, comprising: a fixed body that is provided with a first connecting shaft and a second connecting shaft along the lengthwise direction therein; a linkage assembly of which both ends are respectively hinged to the fixed body and a movable body; the movable body that is provided with a sliding block capable of sliding along the depth direction of the movable body therein, one end of the sliding block being hinged to one end of the linkage assembly, and a straight track surface and an inclined track surface
(Continued)

inclined towards the interior of the sliding block being provided at one side of the sliding block; and a self-closing mechanism that is provided on the side of interior of the movable body close to the straight track surface, has a telescopic structure, and has one end abutting against the side surface of the sliding bock.

15 Claims, 12 Drawing Sheets

(52) U.S. Cl.
CPC ... *E05Y 2201/686* (2013.01); *E05Y 2201/702* (2013.01); *E05Y 2201/704* (2013.01); *E05Y 2900/132* (2013.01)

(58) Field of Classification Search
CPC ......... E05D 3/127; E05D 3/185; E05D 3/186; E05D 7/04; E05D 7/0423; E05D 7/0415; E05D 7/043; E05D 7/0027; E05D 7/0045; E05D 5/02; E05D 5/062; E05D 11/08; E05D 11/00; E05D 11/06; E05D 11/1014; E05D 11/1007; E05D 2007/0438; E05D 2007/0446; E05D 2007/0453; E05D 2007/0461; E05D 2007/0469; E05D 2007/0476; E05D 2007/0484; E05D 2007/0492; E05F 1/1207; E05F 3/20; E05Y 2600/41; E05Y 2600/634; E05Y 2600/412; E05Y 2600/45; E05Y 2600/452; E05Y 2600/46; E05Y 2900/132; E05Y 2900/20; E05Y 2900/50; E05Y 2900/531; E05Y 2900/546; E05Y 2900/606; E05Y 2201/638; E05Y 2201/686; E05Y 2201/702; E05Y 2201/704
USPC ...................... 16/54, 50, 357, 366, 370, 371
See application file for complete search history.

(56) References Cited

U.S. PATENT DOCUMENTS

| | | | | | |
|---|---|---|---|---|---|
| 5,355,557 | A * | 10/1994 | Cress | E05D 11/1014 16/335 |
| 2012/0090135 | A1 * | 4/2012 | Soh | E05D 11/0081 16/250 |
| 2013/0067686 | A1 * | 3/2013 | Migliorini | E05F 1/1253 16/298 |
| 2016/0123056 | A1 | 5/2016 | Polo | |
| 2019/0136596 | A1 * | 5/2019 | Tassi | E05F 3/10 |

FOREIGN PATENT DOCUMENTS

| | | | | |
|---|---|---|---|---|
| CN | 103061629 A | | 4/2013 | |
| CN | 105649451 A | | 6/2016 | |
| CN | 108756554 A | | 11/2018 | |
| CN | 108798327 A | | 11/2018 | |
| CN | 112412218 A | | 2/2021 | |
| CN | 112922476 A | | 6/2021 | |
| CN | 112922481 A | | 6/2021 | |
| CN | 112922484 A | | 6/2021 | |
| CN | 113389454 A | | 9/2021 | |
| CN | 215255444 U | | 12/2021 | |
| DE | 102020108110 B3 | * | 11/2020 | |
| EP | 1857624 A1 | * | 11/2007 | E05D 11/082 |
| EP | 2781676 A1 | * | 9/2014 | E05D 11/1014 |
| JP | 06288139 A | * | 10/1994 | |

* cited by examiner

DOOR HINGE

This application claims a priority to and benefit of Chinese patent application No. 2021101783812, filed on Feb. 9, 2021 and entitled "Door Hinge" and Chinese patent application No. 2021107798205, filed on Jul. 9, 2021 and entitled "Pressure Regulating Device for Door Hinge Self-Closing Mechanism and Door Hinge Including the Same", the entire contents of which are incorporated herein by reference.

TECHNICAL FIELD

The present disclosure relates to a technical field of door hardware, and particularly, to a concealed self-closing door hinge.

DESCRIPTION OF RELATED ART

At present, a door of a building such as a shopping mall, a residential quarter, an office building, a meeting room is mostly a door that can be automatically closed. One of the implementation methods of this type of door is to use a door hinge with a self-closing function. However, most of the door hinges with self-closing function are surface-mounted hinges, and the exposed parts of such surface-mounted hinges are easy to damage the overall effect of the door. Whereas the traditional hidden door hinge is mounted in a concealed manner, however it cannot realize the effect of closing the door automatically.

SUMMARY

An embodiment of the present disclosure is directed to solving the above technical problem, and the purpose thereof is to provide a door hinge which can achieve concealed mounting as well as the function of automatic closing.

In order to achieve the above purpose, an embodiment of the present disclosure provides a door hinge, including:

a fixed body which is a hollow housing;

a linkage assembly comprising a plurality of linkage blocks for connecting a movable body and the fixed body;

the movable body which is a hollow housing, wherein the movable body is internally provided with a sliding block which is slidable along a depth direction of the movable body, wherein one end of the sliding block is hinged connected to the linkage assembly, and one side of the sliding block is provided with a straight track surface and an inclined track surface inclined toward a middle of the sliding block; and a self-closing mechanism disposed on a side of the movable body close to the straight track surface, wherein the self-closing mechanism has a telescopic structure extensible and retractable along a lengthwise direction of the movable body, wherein one end of the self-closing mechanism abuts against a side surface of the sliding block, and wherein the sliding block is driven to slide toward an inside of the movable body when the end of the self-closing mechanism abuts against the inclined track surface and extends.

According to the above description and practice, the door hinge of an embodiment of the present disclosure can achieve not only concealed mounting but also the function of automatic closing.

BRIEF DESCRIPTION OF DRAWINGS

The above-mentioned features and technical advantages of the present disclosure will become clearer and easier to understand by describing the embodiments thereof in conjunction with the following drawings in which.

Figure 1:
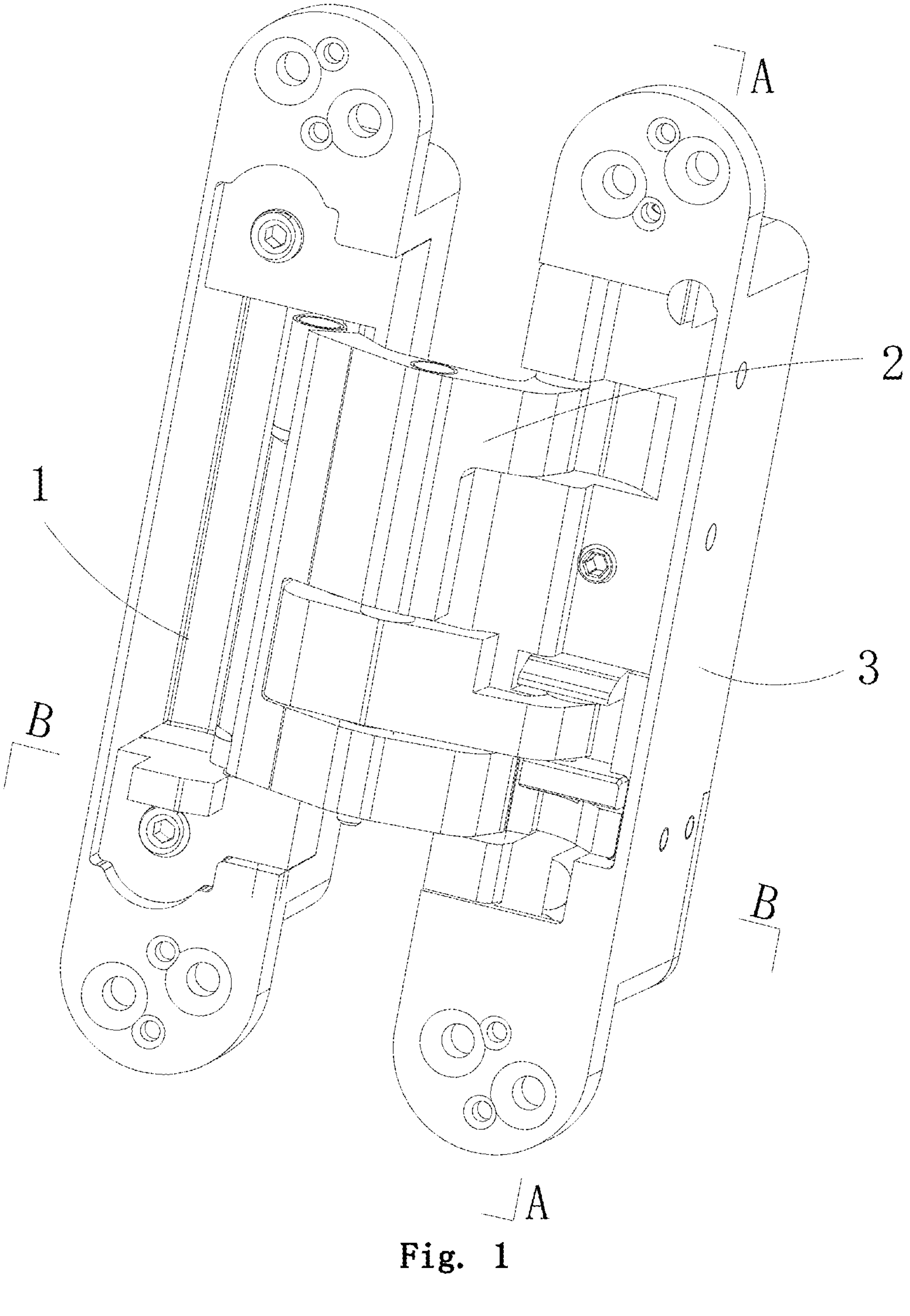
FIG. 1 is a schematic perspective structural view of the door hinge according to Embodiment 1 of the present disclosure.
Figure 2:
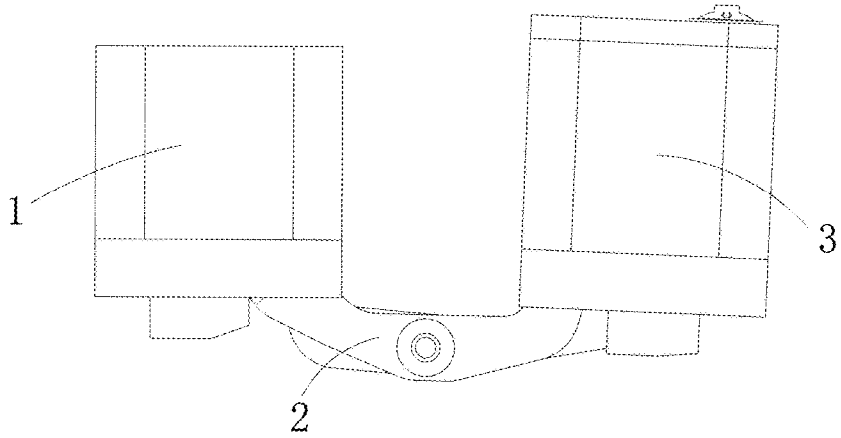
FIG. 2 is a top view of the door hinge according to Embodiment 1 of the present disclosure.
Figure 3:
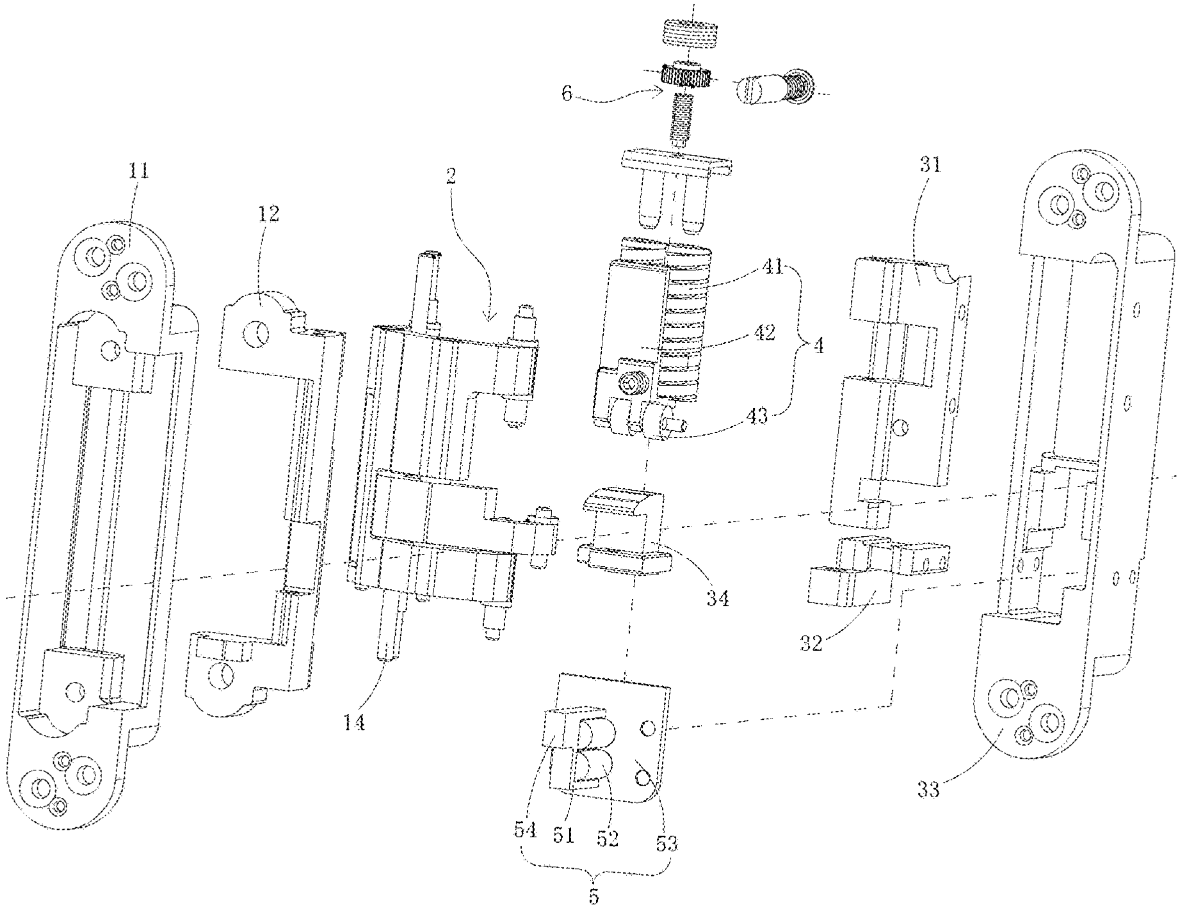
FIG. 3 is an exploded schematic view of the door hinge at a first viewing angle according to Embodiment 1 of the present disclosure.
Figure 4:
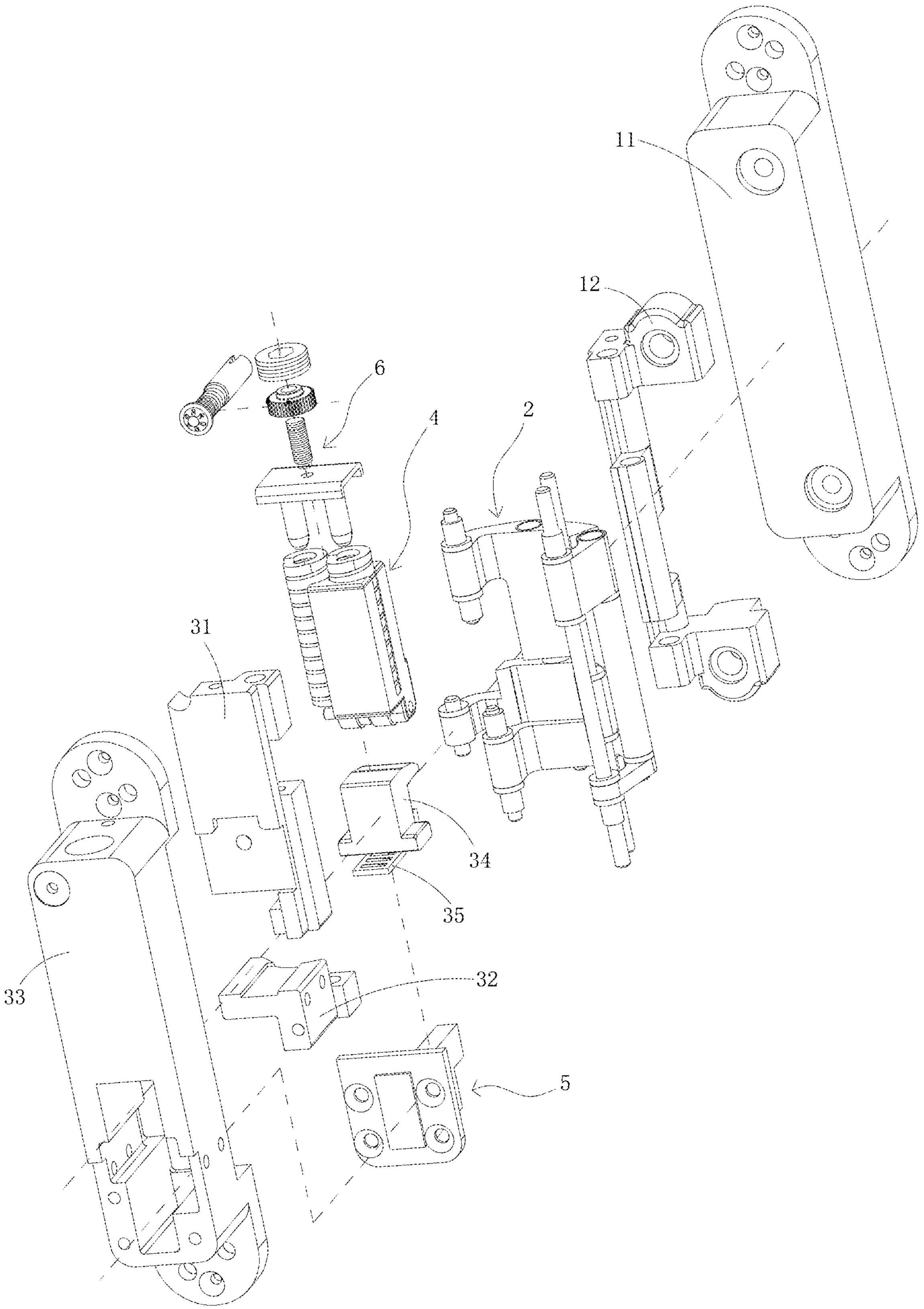
FIG. 4 is an exploded schematic view of the door hinge at a second viewing angle according to Embodiment 1 of the present disclosure.
Figure 5:
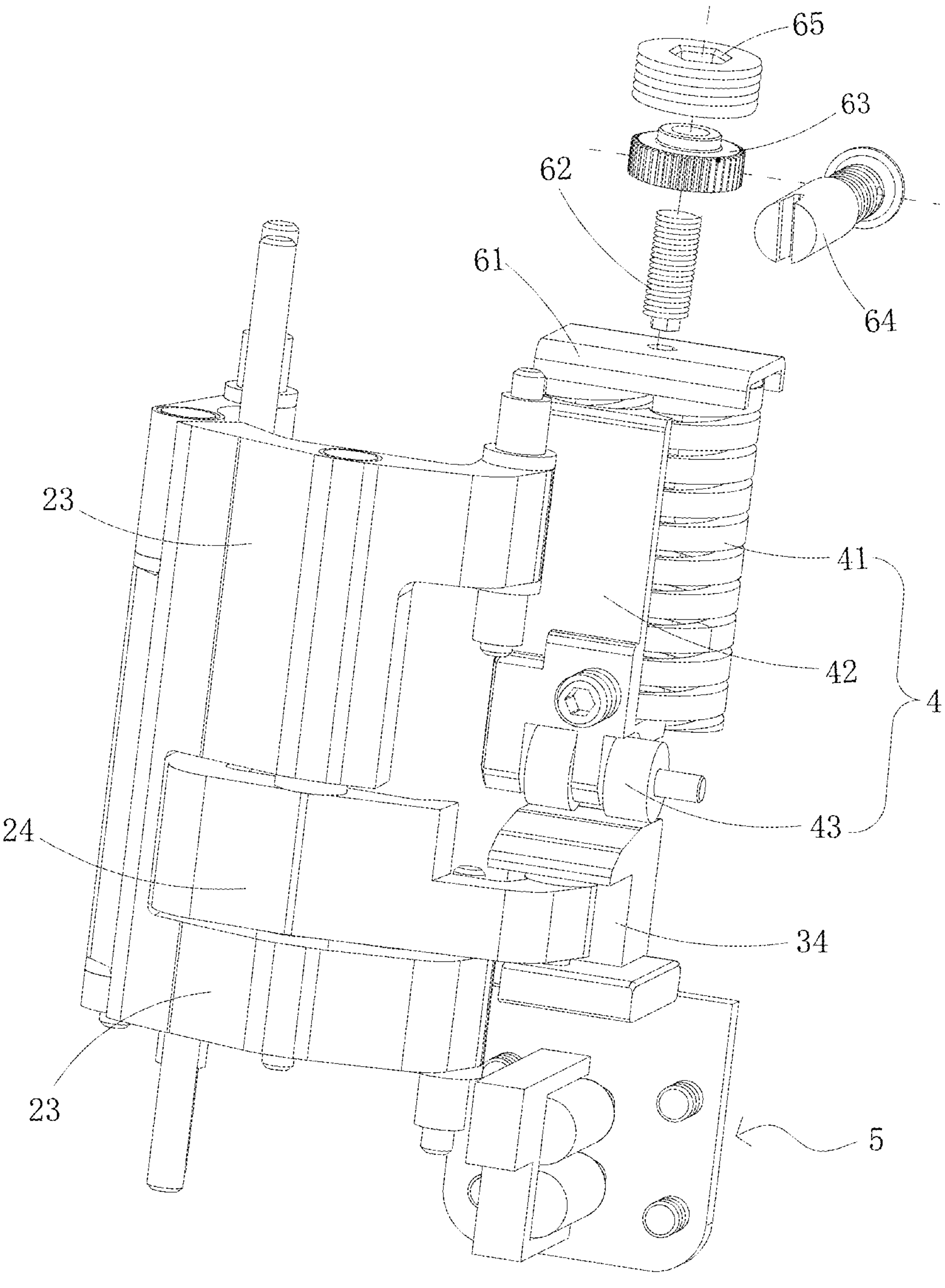
FIG. 5 is a schematic view of the internal structure of the door hinge at a first viewing angle according to Embodiment 1 of the present disclosure, wherein the adjustment mechanism is in an exploded state for clear illustration of the components.
Figure 6:
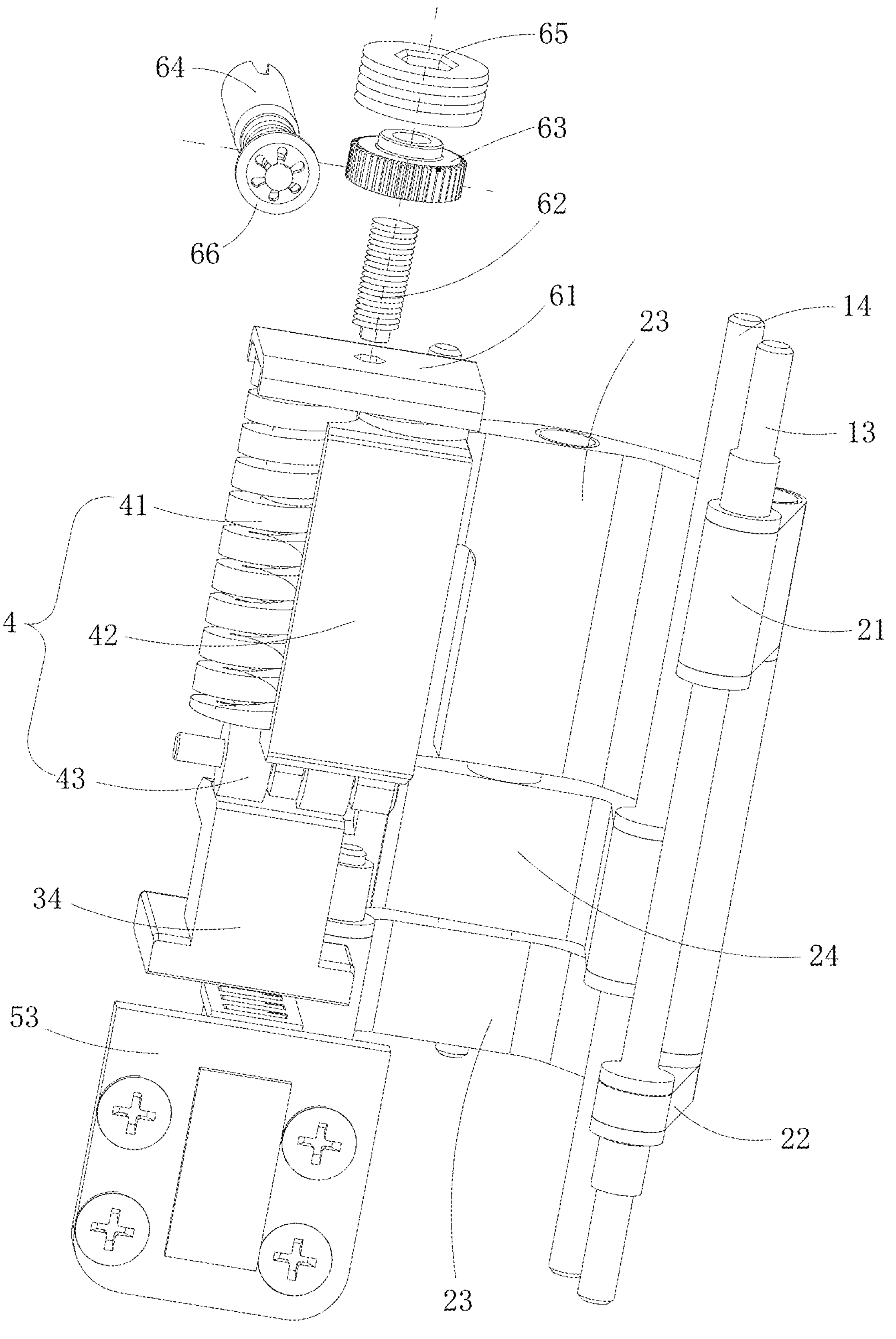
FIG. 6 is a schematic view of the internal structure of the door hinge at a third viewing angle according to Embodiment 1 of the present disclosure, wherein the adjustment mechanism is in an exploded state for clear illustration of the components.
Figure 7:
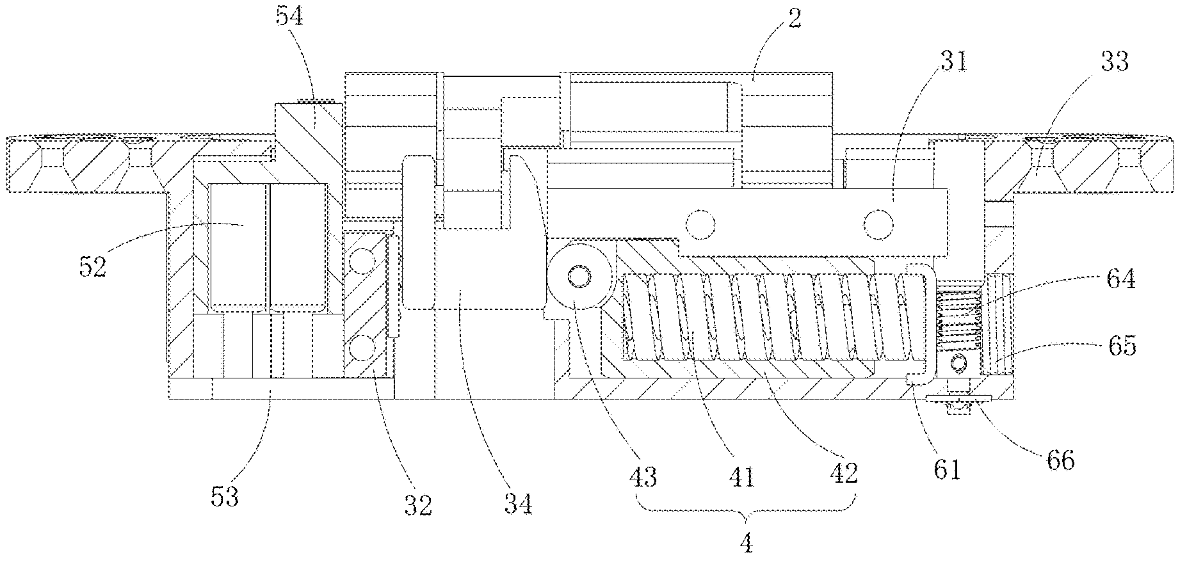
FIG. 7 is a schematic structural view of section A-A in FIG. 1, illustrating only the sectional structure of the movable body.

The reference numbers in the drawings are as follows:

1 Fixed Body, 11 Fixed base, 12 Fixed Base Fixing Block, 13 First Connecting Shaft, 14 Second Connecting Shaft, 15 Fixed Body Through Hole;

2 Linkage Assembly, 21 First Linkage Block, 22 Second Linkage Block, 23 Third Linkage Block, 24 Fourth Linkage Block, 25 Shaft Sleeve;

3 Movable Body, 31 First Fixing Block Of The Movable Base, 32 Second Fixing Block Of The Movable Base, 33 Movable Base, 34, Sliding Block, 35 In-Line Bearing, 36 Movable Body Through Hole, 37 First Bearing, 38 First Guide Groove, 39 Second Guide Groove, 340 Inclined Track Surface, 341 Straight Trace Surface, 342 First Inclined Track Surface, 343 Second Inclined Track Surface;

4 Self-Closing Mechanism, 41 Energy Storage spring, 42 Spring Sliding Block, 43 Second Bearing;

5 Buffer Mechanism, 51 Damping Sliding Block, 52 Damper, 53 Top Plate, 54 Top Block;

6 Adjustment Mechanism, 61 Spring Top Block, 62 First Screw, 63 Worm Gear, 64 Worm Screw, 65 Fixing Block, 66 Buckle, 67 First Sliding Block, 68 Second Sliding Block, 69 Second Screw, 671 First Inclined Surface, 681 Second Inclined Surface, 682 Limiting Groove, 691 The Connecting Portion.

DETAILED DESCRIPTIONS

Exemplary embodiments will be described hereinafter more fully with reference to the accompanying drawings. Exemplary embodiments may, however, be embodied in various forms and should not be construed as limited to those set forth herein; instead, these embodiments are provided so that this disclosure will be thorough and complete and will fully convey the concept of exemplary embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numbers in the drawings denote the same or similar parts, and thus repeated descriptions thereof will be omitted. It should be noted that in the present disclosure, the terms "comprising", "configured with", and "disposed at" are used to express an open and inclusive meaning, and mean that there may be other elements/components/etc., in addition to the listed elements/components/etc.; the terms "first", "second", etc. are used only as markers, not as limitations to the number or order of their objects; the terms "center", "upper", "lower", "left", "right", "vertical", "horizontal", "inner", "outer" and other indicated orientations or positional relationships are based on the orientations or positional relationships shown in the drawings, and are only for the convenience of describing this disclosure and simplified description, rather than indicate or imply that the device or element referred to must have a particular orientation or be constructed or operated in a particular orientation, and thus should not be construed as limiting the present disclosure.

Unless otherwise clearly specified and limited, the terms "install", "connect" and "couple" should be interpreted in a broad sense. For example, it may be a fixed connection, a detachable connection, or an integral connection; it may be a mechanical connection or it can also be an electrical connection; it can be a direct connection, or an indirect connection through an intermediary, or an internal communication between two elements. Those skilled in the art can understand the specific meanings of the above terms in the present disclosure according to specific contexts.

In this disclosure, expressions in the singular (e.g., a, an) are also intended to include the plural unless specifically stated otherwise. In addition, in the present disclosure, when "an embodiment", "some embodiments" or similar expressions are used, it may refer to the same one or some embodiments or may refer to a different one or some embodiments, unless otherwise specified.

Embodiment 1

Please refer to FIGS. 1 to 7, in this embodiment, the door hinge is a concealed mounting typed hinge and has the function of automatically closing within a preset angle range. Specifically, the door hinge includes the following structures: a fixed body 1, a linkage assembly 2, a movable body 3 and a self-closing mechanism 4. When in use, the fixed body 1 is disposed on the door frame and the movable body 3 is disposed on the door, or the movable body 3 is disposed on the door frame and the fixed body 1 is disposed on the door. Two ends of the linkage assembly 2 are connected to the fixed body 1 and the movable body 3 respectively, and when the door is closed, the linkage assembly 2 drives the fixed body 1 and the movable body 3 to approach to each other, and when the door is opened, the linkage assembly drives the fixed body 1 and the movable body 3 to separate from each other.

Here, the fixed body 1 includes a fixed base 11 and a fixed base fixing block 12. The fixed base 11 has a hollow cavity in the middle thereof, and both ends of the fixed base 11 are provided with connecting plates for connecting with the door frame, and the fixed body 1 may be fixed on the door frame by screws. The fixed base fixing block 12 is detachably mounted in the cavity in the middle of the Fixed base 11 through bolts. The fixed base fixing block 12 is a U-shaped structure, and there is a cavity for accommodating part of the linkage assembly 2 between the fixed base fixing block 12 and the fixed base 11. In addition, a first connecting shaft 13 and a second connecting shaft 14 are sequentially arranged in the fixed base fixing block 12 along the depth direction of the fixed base 11, and the first connecting shaft 13 is close to the inner side of the fixed base 11. In the exploded views of FIGS. 3 and 4, in order to illustrate the connection relationship between the fixed body 1 and the linkage assembly 2, the first connection shaft 13 and the second connection shaft 14 both penetrating the linkage assembly 2 are not exploded illustrated.

The above-mentioned fixed body 1 adopts a structure in which the fixed base 11 and the fixed base fixing block 12 are assembled, the purpose thereof is to facilitate the assembly of the door hinge; however, in other embodiments, the fixed base 11 and the fixed base fixing block 12 may be provided as an integrated structure, which can also realize the functions of automatic closing and concealed mounting.

Figure 13:
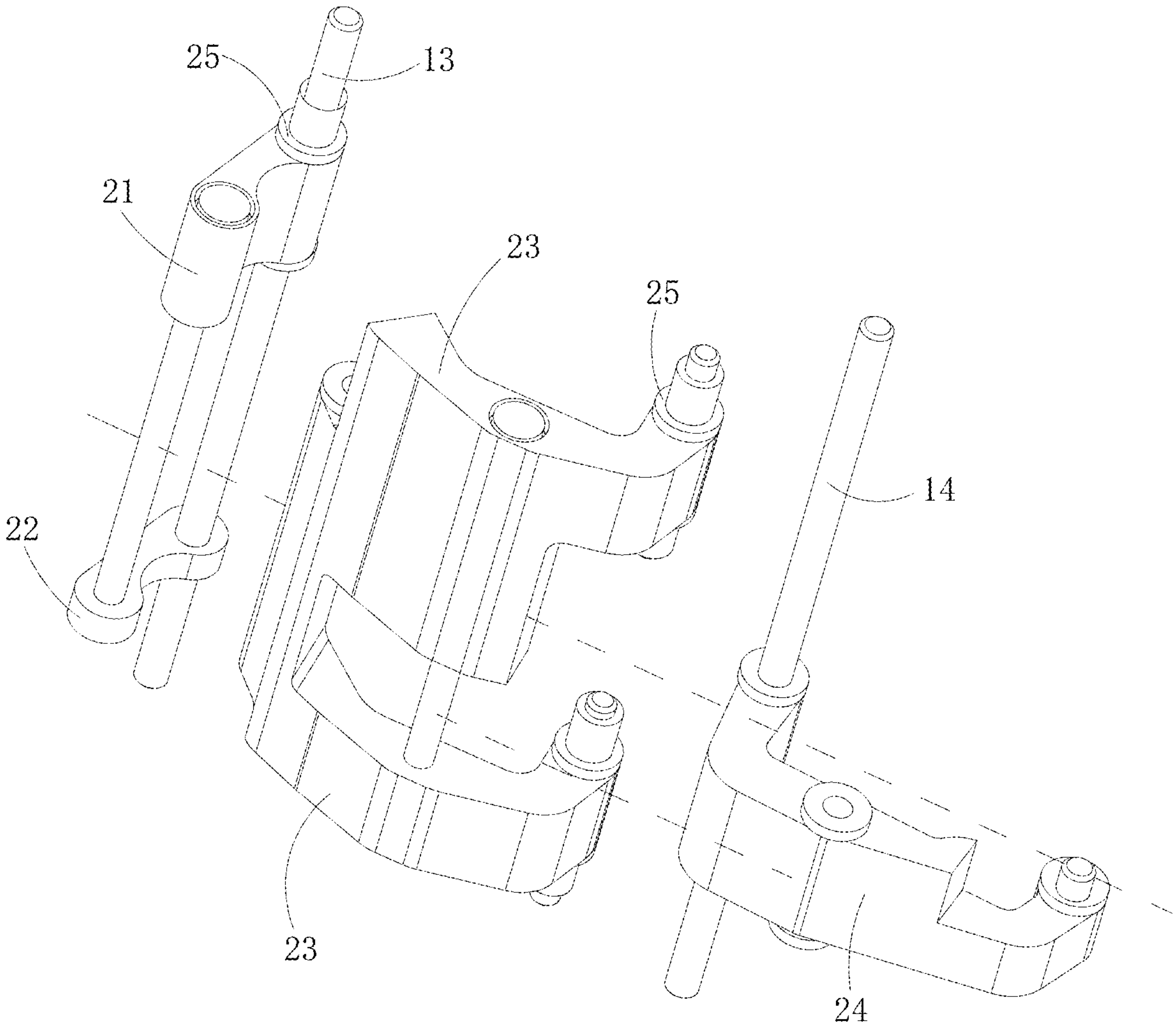
FIG. 13 is an exploded schematic structural view of the linkage assembly according to Embodiment 1 of the present disclosure.

Please refer to FIG. 13, the linkage assembly 2 includes a first linkage block 21, a second linkage block 22, a third linkage block 23 and a fourth linkage block 24. The above-mentioned linkage blocks are all curved plates, and are provided with through holes through which connecting shafts penetrate at two ends. In addition, the middle portion of the third linkage block 23 is provided with an opening through which the fourth linkage block 24 penetrates, and the middle portion of the opening and the middle portion of the fourth linkage block 24 are provided with through holes through which the connecting shafts penetrate, and the middle portion of the third linkage block 23 and the middle portion of the fourth linkage block 24 are hinged by the connecting shaft.

One end of the first linkage block 21 and one end of the second linkage block 22 are hinged to the first connecting shaft 13, and the other end of the first linkage block 21 and the other end of the second linkage block 22 are hinged to one end of the third linkage block 23 by the connecting shaft. The end of the fourth linkage block 24 close to the fixed body 1 is hinged to the second connecting shaft 14.

The movable body 3 includes a movable base 33, a first fixing block 31 of the movable base and a second fixing block 32 of the movable base. The middle portion of the movable base 33 has a hollow cavity, and the movable base 33 are provided with connecting plates for connecting with the door at both ends thereof. The first fixing block 31 of the movable base and the second fixing block 32 of the movable base are detachably fixed on the movable base 33 by rivets, and divide the cavity in the movable base 33 into three accommodating cavities for accommodating the sliding block 34, the self-closing mechanism 4 and the buffer mechanism 5. The first fixing block 31 of the movable base is provided with through holes facing each other to be penetrated by the connecting shaft, and the side wall of the first fixing block 31 of the movable base adjacent to the second fixing block 32 of the movable base is also provided with a through hole to be penetrated by the connecting shaft. The through holes at the two positions are used to hinge and connect the third linkage block 23. One end of the third linkage block 23 close to the movable body 3 has two arms and is hinged to the first fixing block 31 of the movable base and the second fixing block 32 of the movable base by the connecting shaft.

Figure 12:
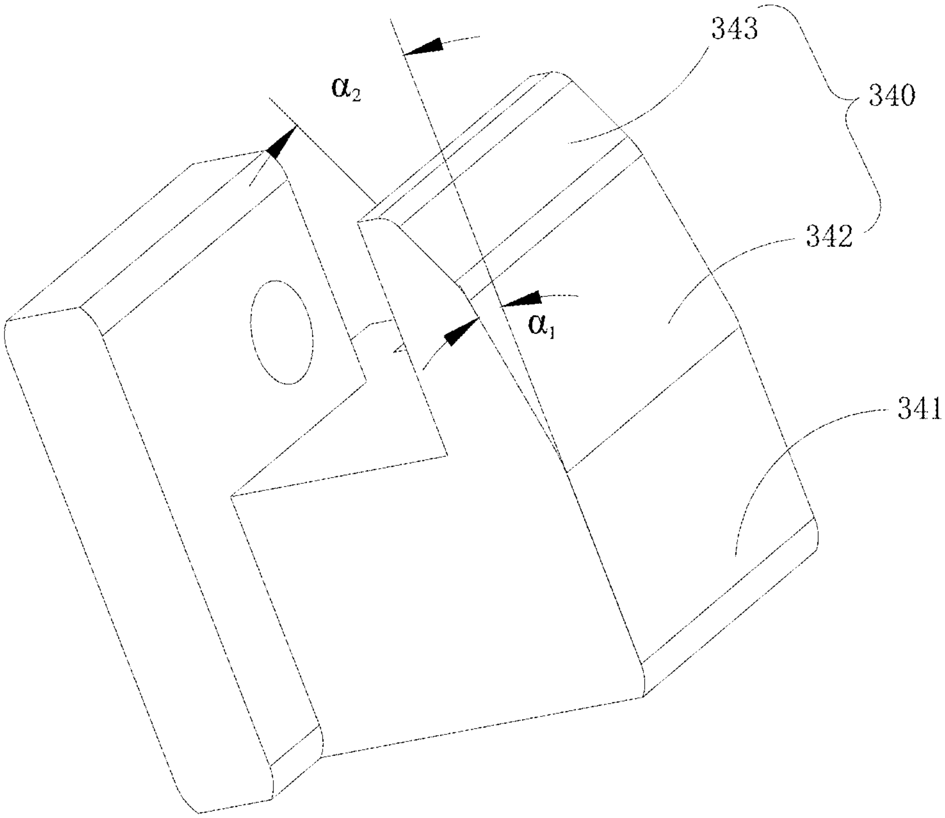
FIG. 12 is a schematic structural view of the sliding block according to Embodiment 1 of the present disclosure.

A sliding block 34 is slidably assembled at a position facing the fourth linkage block 24 in the movable body 3, and the inner wall of the movable body 3 is provided with a limiting groove in which the sliding block 34 slides along the depth direction. With reference to FIG. 12, a U-shaped notch is provided in the middle portion of the sliding block 34, and the two side walls of the U-shaped notch are provided with through holes facing each other for hinged to the end of the fourth linkage block 24 by the connecting shaft. When the door is opened and closed, the sliding block 34 is driven by the fourth linkage block 24 to slide along the depth direction of the movable body 3.

One side of the sliding block 34 is a straight surface, and abuts on the side wall of the second fixing block 32 of the movable base, and an in-line bearing 35 is further disposed between the side wall of the second fixing block 32 of the movable base and the sliding block 34, to improve the sliding efficiency of the sliding block 34; the other side of the sliding block 34, that is, the side close to the first fixing block 31 of the movable base, is provided with a straight track surface 341 and an inclined track surface connected to each other, and the inclined track surface is inclined toward the middle of the sliding block 34, and is configured to cooperate with the self-closing mechanism 4 to drive the sliding block 34 to slide toward the inner side of the movable body 3, thereby driving the door hinge to close. This embodiment is provided with two inclined track surfaces in total, they are a first inclined track surface 342 and a second inclined track surface 343 arranged in sequence along the depth direction. The angle between the first inclined track surface 342 and the straight track surface 341 is $\alpha_1$, the angle between the second inclined track surface 343 and the straight track surface 341 is $\alpha_2$, and $\alpha_1<\alpha_2$. The portions where the above-mentioned straight track surface 341, the first inclined track surface 342 and the second inclined track surface 343 are adjacent to one another are designed to be rounded with an arc, which is convenient for the self-closing mechanism 4 to roll on the portions. In one embodiment, $9°\leq\alpha_1<45°$, $24°\leq\alpha_2\leq45°$.

In this embodiment, a specific structural form of the linkage assembly 2 and its connection relationship with the fixed body 1 and the movable body 3 are given. However, in other embodiments, the specific composition structure of the linkage assembly 2 may also be changed, for example, increasing or decreasing the quantity of the connecting block or changing the shape of the connecting block can also realize the function of the concealed door hinge.

The above-mentioned fixed base fixing block 12, the first linkage block 21, the second linkage block 22, the third linkage block 23, the fourth linkage block 24, the sliding block 34, the first fixing block 31 of the movable base and the second fixing block 32 of the movable base are hinged to each other by means of connecting shafts. In order to avoid friction occurring between adjacent structures, a shaft sleeve 25 is sleeved on the connecting shafts at the hinged positions.

The self-closing mechanism 4 is disposed on the side close to the straight track surface 341 in the movable body 3 and has a telescopic structure extensible and retractable along the lengthwise direction of the movable body 3, and one end of the self-closing mechanism 4 abuts against the side surface of the sliding block 34. When the end of the self-closing mechanism 4 abuts against the inclined track surface, the sliding block 34 is driven to slide toward the inside of the movable body 3 by its own elastic force, thereby driving the door hinge to close.

Figure 8:
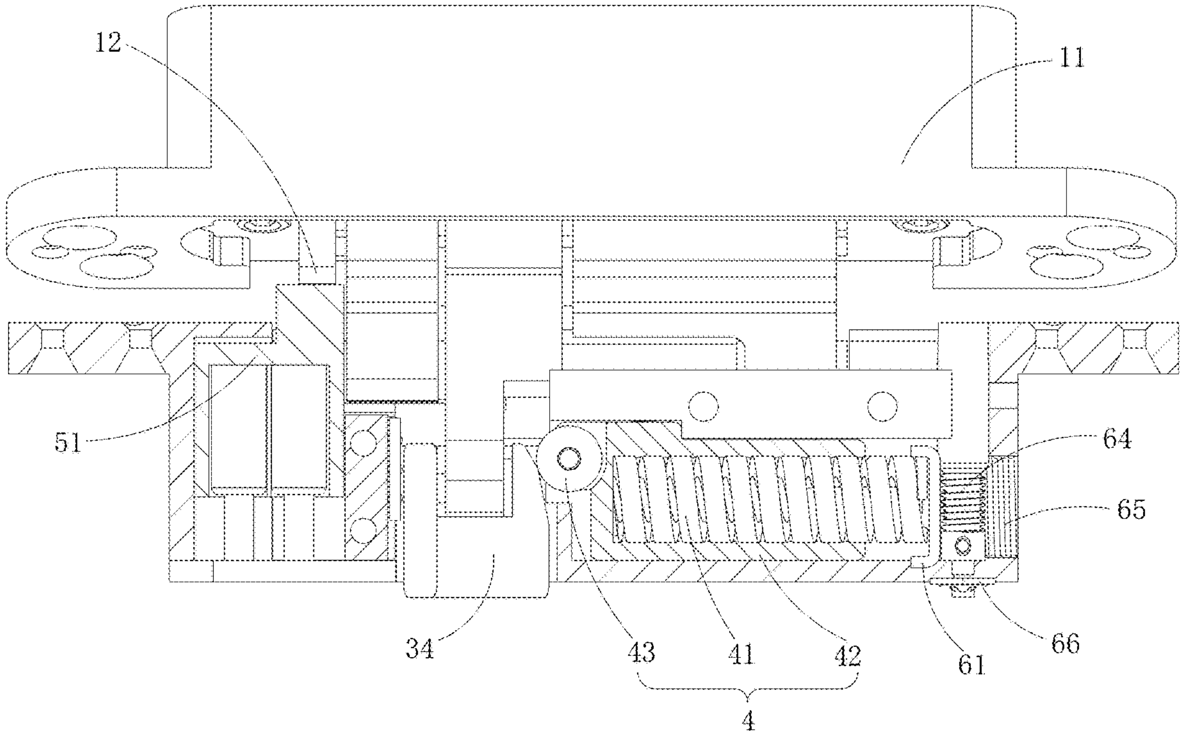
FIG. 8 is a schematic structural view of section A-A in FIG. 1, illustrating only the sectional structure of the movable body when the buffer mechanism starts the operation of buffering.
Figure 9:
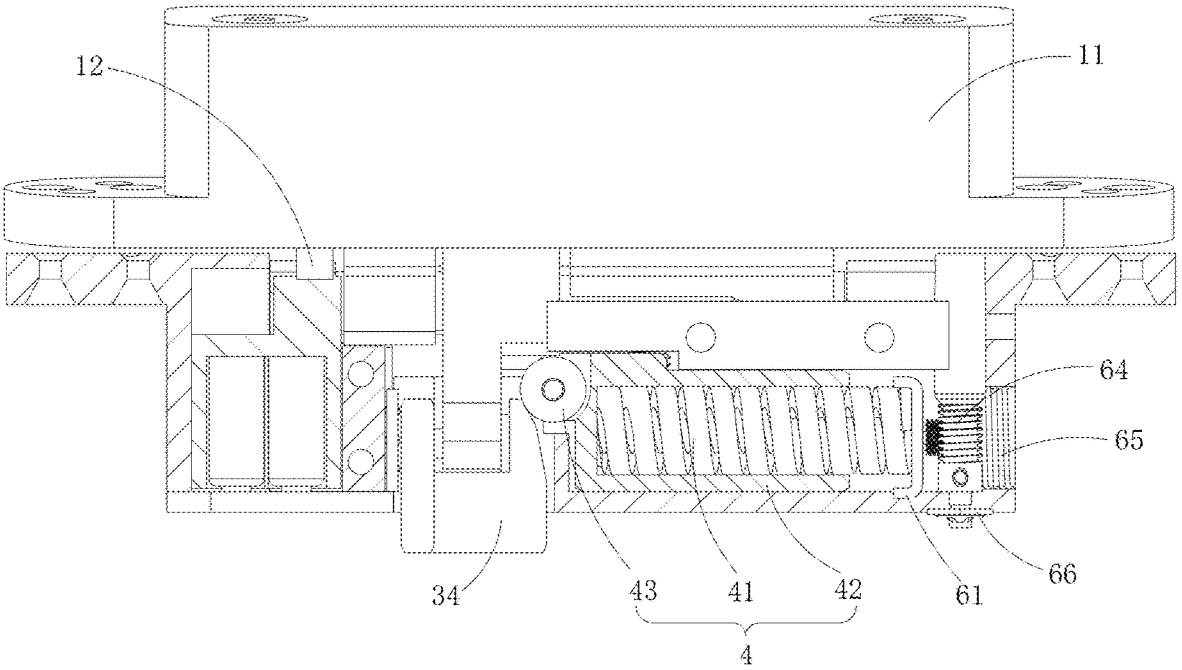
FIG. 9 is a schematic structural view of section A-A in FIG. 1, illustrating only the sectional structural schematic view of the movable body when the door hinge is automatically being closed.
Figure 10:
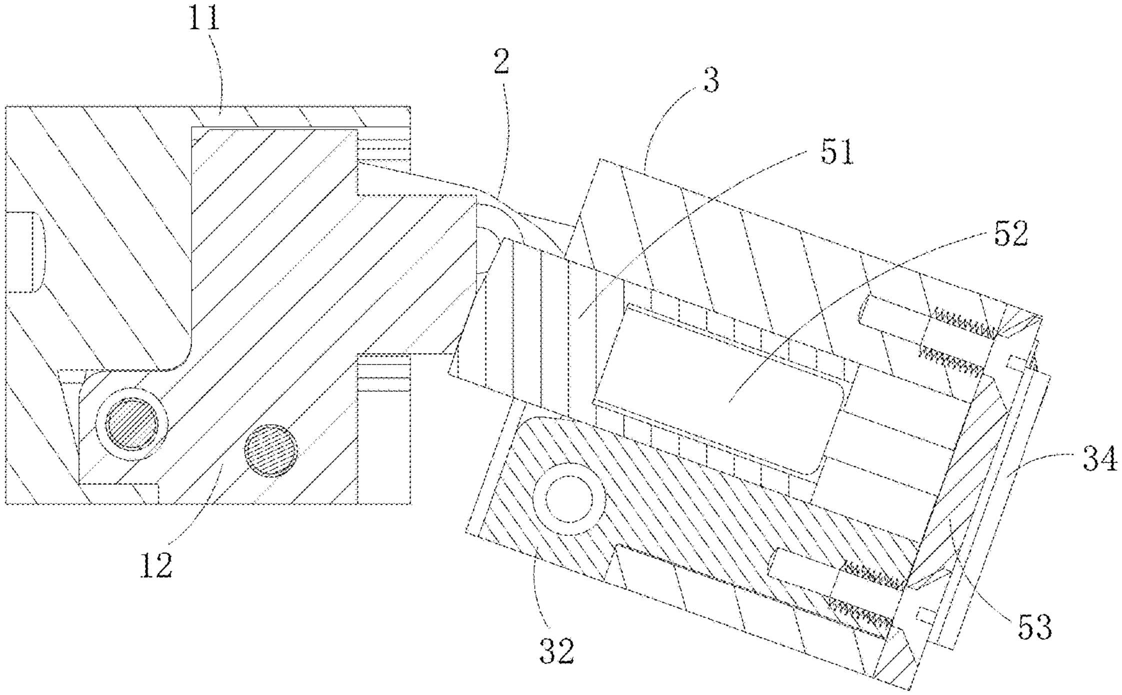
FIG. 10 is a schematic structural view of section B-B in FIG. 1, illustrating the sectional structure of the door hinge when the buffer mechanism starts the operation of buffering.
Figure 11:
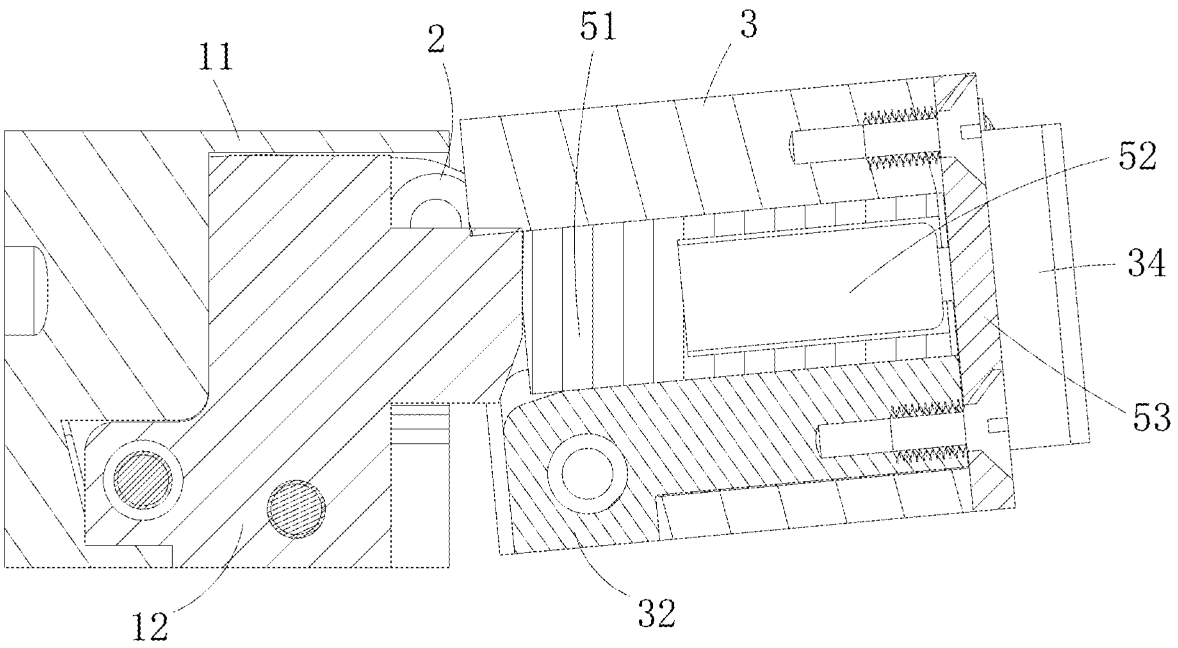
FIG. 11 is a schematic structural view of section B-B in FIG. 1, illustrating the sectional structure of the door hinge when the buffer mechanism finishes the operation of buffering.

With reference to FIGS. 8 and 9, in this embodiment, the self-closing mechanism 4 includes an energy storage spring 41, a spring sliding block 42 and a second bearing 43. Here, the energy storage spring 41 is disposed along the lengthwise direction of the movable body 3, with one end connected to the inner wall of the movable body 3 via the adjustment mechanism 6 and the other end provided with a spring sliding block 42. As illustrated in the exploded views of FIGS. 3 and 4, the spring sliding block 42 is a U-shaped structure, and provided with two energy storage springs 41 described in the above therein. One end of the spring sliding block 42 away from the energy storage spring 41 is hinged and provided with a second bearing 43, and the second bearing 43 abuts against the side surface of the sliding block 34. The spring sliding block 42 is movable along the lengthwise direction of the movable body 3 under the action of the elastic force of the energy storage spring 41. When the door hinge is completely opened, the sliding block 34 is at the side closer to outer end of the movable body 3. At this time, the second bearing 43 abuts against the straight track surface 341. When the door hinge is operated to be closed, the sliding block 34 gradually moves towards the inside of the movable body. When the second bearing 43 abuts against the first inclined track surface 342, the force applied by the self-closing mechanism 4 to the sliding block 34 has a component force along the depth direction, which can drive the sliding block 34 to continue to move towards the inside of the movable body 3, thereby driving the door hinge to close automatically. At this time, the opening angle of the door hinge is the angle at which the door hinge can be automatically closed. By adjusting the initial position of the first inclined track surface 342, the angle can be adjusted.

The adjustment mechanism 6 is disposed between the energy storage spring 41 and the inner wall of the movable body 3, and functions to adjust the magnitude of the elastic force of the energy storage spring 41, thereby adjusting the power of the self-closing mechanism 4. With reference to FIGS. 3 to 7, the adjustment mechanism 6 includes a spring top block 61, a first screw 62, a worm gear 63, a worm screw 64 and a fixing block 65. Here, one end of the spring top block 61 has a plate body, and the other end of the spring top block 61 has two legs penetrating the energy storage spring 41. One end of the first screw 62 is fixedly connected to the plate body of the spring top block 61, and the first screw 62 and the spring top block 61 cannot rotate with respect to each other, and the first screw 62 is provided with male threads thereon. The worm gear 63 is threadedly connected to the first screw 62, and the worm screw 64 is engaged with the worm gear 63 to drive the worm gear 63 to rotate. The worm screw 64 is hinged to the movable body 3, with one end thereof penetrating the first fixing block 31 of the movable base and the other end having reduced diameter and penetrating through the side wall of the movable base 33, and a buckle 66 is provided at the end to prevent the worm screw 64 from disengaging from the movable body 3. An in-line groove is provided on the end surface of the worm screw 64 close to the first fixing block 31 of the movable base, to rotate the worm screw 64 by cooperating with an in-line screwdriver. The fixing block 65 is a hollow cylindrical structure, and provided with threads on its outer circumference and penetrated into the end inner wall of the movable base 33. One end of the first screw 62 penetrates into the fixing block 65, and the end surface of the worm gear 63 abuts against the end surface of the fixing block 65 to function to block the worm gear 63 from moving towards the outside of the movable base 33 along the lengthwise direction.

Under the elastic force of the energy storage spring 41, the worm gear 63 always abuts against the end surface of the fixing block 65. The worm screw 64, when rotating clockwise or counterclockwise, can drive the worm gear 63 to rotate. Since the movement of the worm gear 63 in the lengthwise direction is limited, the first screw 62 may move along the lengthwise direction so as to adjust the distance between the spring top block 61 and the inner wall of the movable base 33, that is, the magnitude of the elastic force of the energy storage spring 41, thereby adapting to the door of different weights to enable the door to be smoothly closed.

With reference to FIGS. 8 to 11, a buffer mechanism 5 for controlling the closing speed of the door hinge is further provided in the movable body 3. The buffer mechanism 5 includes a top plate 53, a damper 52 and a damping sliding block 51. Here, the top plate 53 is a rectangular plate body to function to detachably connect the buffer mechanism 5 to the movable base 33. The damper 52 may be a hydraulic damper or other conventional damper, with one end fixedly connected to the top plate 53 and the other end being a free end. The damping sliding block 51 is a U-shaped structure, and the groove end of the damping sliding block is fitted on the free end of the damper 52, and a limiting groove in which the damping sliding block 51 slides along the depth direction is provided in the movable base 33. One end of the damping sliding block 51 close to the fixed body 1 is provided with a top block 54 protruding outward, and the top block 54 is positioned at the outside of the movable body 3 under the elastic force of the damper 52. Meanwhile, a protrusion is provided at a position of the fixed base fixing block 12 of the fixed body 1 facing the top block 54. During the closing process of the door hinge, the top block 54 abuts against the protrusion at first, and at this moment, the damper 52 is subjected to force and slows down the closing speed of the door hinge. Preferably, the top block 54 exactly abuts against the protrusion when the second bearing 43 abuts against the second inclined track surface 343. Because the angle between the second inclined track surface 343 and the straight track surface 341 becomes larger, the force applied by the self-closing mechanism 4 to the sliding block 34 in the depth direction becomes larger, that is, the force of closing the door becomes larger, thereby ensuring that the door hinge has enough force to close the door while the buffer mechanism 5 slows down the closing speed of the door hinge.

The door hinge is disposed on the door, and when the door is opened, the second bearing 43 at one end of the self-closing mechanism 4 abuts against the straight track surface 341 on the side surface of the sliding block 34. Since the self-closing mechanism 4 is perpendicular to the straight track surface 341, the force applied by the energy storage spring 41 to the sliding block 34 does not has component force along the depth direction of the movable body 3, and at this time, the door can always be in an open state. When the door is operated to be closed, the sliding block 34 moves inward along the depth direction of the movable body 3, and at this time, the second bearing 43 gradually moves to the side of the inclined track surface on the side surface of the sliding block 34, and when the second bearing 43 abuts against the inclined track surface, the force applied by the energy storage spring 41 to the sliding block 34 has a component force along the depth direction of the movable body 3, and at this time, the sliding block 34 can continue to move towards the inside of the movable body 3 without external force, thereby driving the door to continue to close.

Embodiment 2

Compared with Embodiment 1, another structural form of the adjustment mechanism 6 is disclosed in this embodiment. On this basis, the structures of the fixed body 1 and the movable body 3 are correspondingly changed. Therefore, only the differences in structure and connection relationship from Embodiment 1 will be described below.

Figure 14:
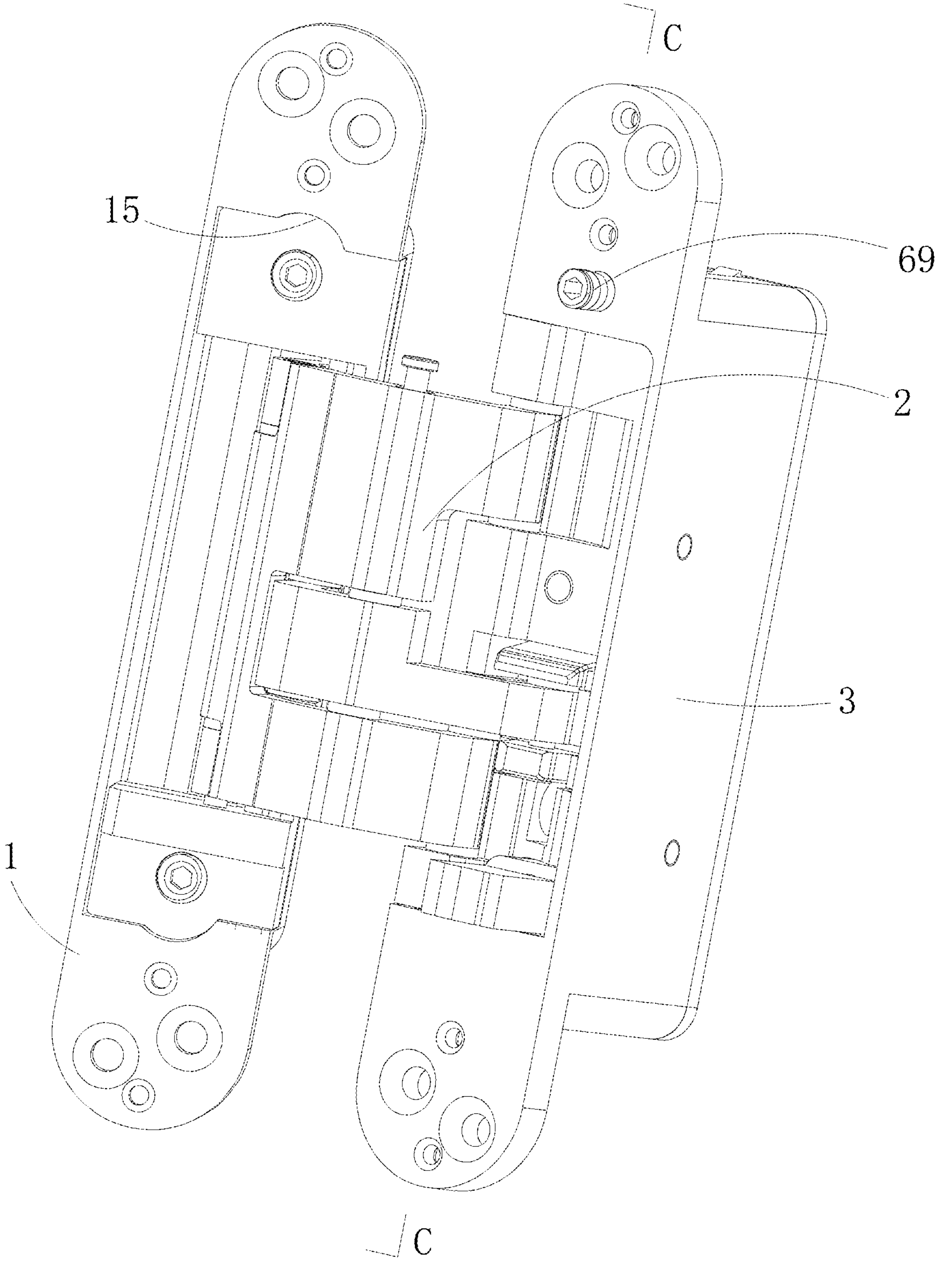
FIG. 14 is a schematic perspective structural view of the door hinge according to Embodiment 2 of the present disclosure.
Figure 15:
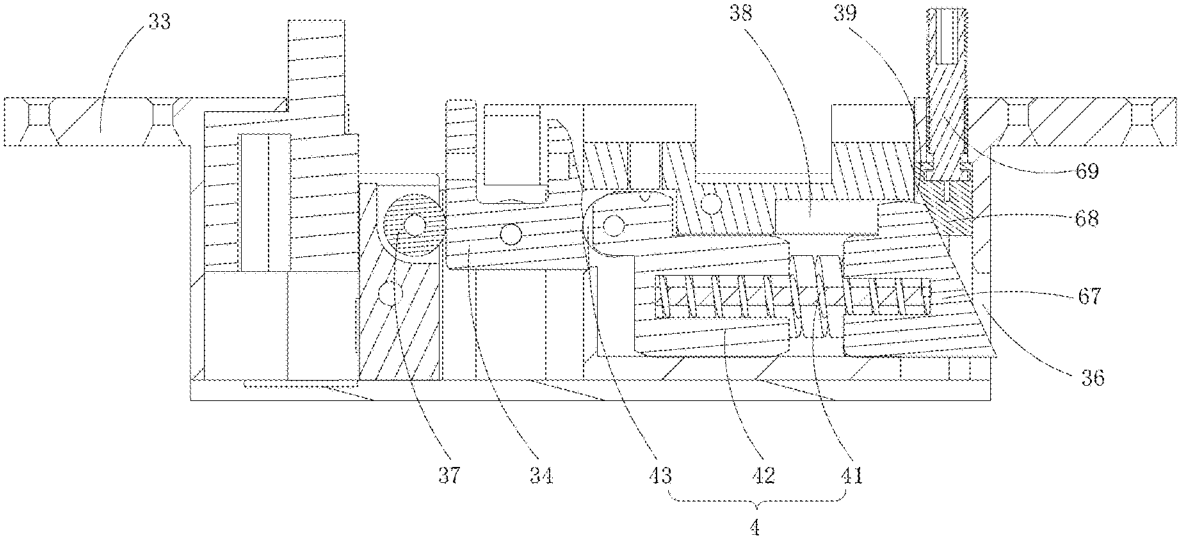
FIG. 15 is a schematic structural view of section C-C in FIG. 14, illustrating only the sectional structure of the movable body.
Figure 16:
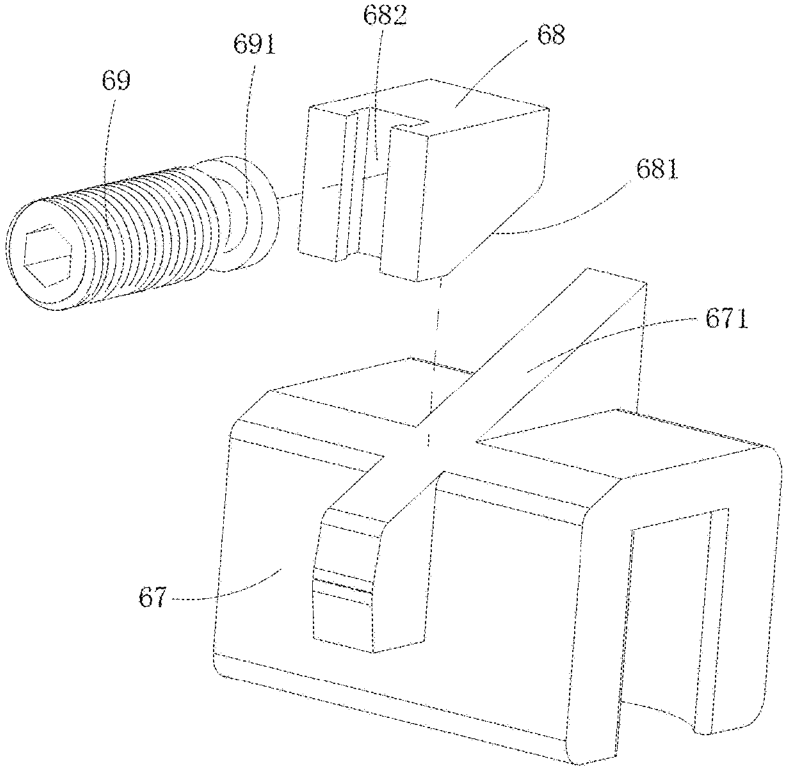
FIG. 16 is an exploded schematic structural view of the adjustment mechanism according to Embodiment 2 of the present disclosure.

With reference to FIGS. 14 to 16, in this embodiment, the adjustment mechanism 6 is also disposed between the energy storage spring 41 and the inner wall of the movable body 3 to function to adjust the magnitude of the elastic force of the energy storage spring 41, thereby adjusting the power of the self-closing mechanism 4. Specifically, the adjustment mechanism 6 includes a first sliding block 67, a second sliding block 68 and a second screw 69. Here, the first sliding block 67 is slidably assembled in the movable body 3 and is slidable along the extending and retracting direction of the energy storage spring 41. One end of the first sliding block 67 is provided with a groove for accommodating the energy storage spring 41, one end of the energy storage spring 41 abuts against the inner wall of the groove, and the other end of the first sliding block 67 is provided with a first inclined surface 671. The second sliding block 68 is slidably assembled in the movable body 3, and the sliding direction of the second sliding block 68 is perpendicular to the extending and retracting direction of the energy storage spring 41, that is, the second sliding block 68 slides along the depth direction of the movable body 3. A second inclined surface 681 abutting against the first inclined surface 671 is provided on a side surface of the second sliding block 68. The second screw 69 is threadedly connected to the side wall of the movable body 3, with one end thereof rotationally connected to the end of the second sliding block 68 away from the first sliding block 67. During use, rotation of the second screw 69 can drive the second sliding block 68 to slide, and the second inclined surface 681 abuts against the first inclined surface 671 and thereby drives the first sliding block 67 to slide along the lengthwise direction of the energy storage spring 41, so as to change the length of the energy storage spring, i.e., changing the elastic force of the energy storage spring 41. Therefore, the pressure of the self-closing mechanism 4 is adjusted to adapt to doors of different weight, so that the doors can be closed smoothly.

Specifically, one end of the second screw 69 is provided with a connecting portion 691, and one end of the second sliding block 68 is provided with a limiting groove 682 for accommodating the connecting portion 691. The connecting portion 691 is caught in the limiting groove 682, so that the connecting portion 691 can rotate about the axial direction of the second screw 69. In this embodiment, the connecting portion 691 has a shape of a round cake, and the limiting groove 682 is a bar-shaped groove, and the size of the opening on the side of the limiting groove is smaller than the outer diameter of the connecting portion 691, so that the connecting portion 691 is caught in the limiting groove 682 to prevent the connecting portion 691 from performing an axial displacement along the second screw 69 in the limiting groove 682. In other embodiments, the connecting portion 691 may also have a spherical shape, which can also function to rotatably connect the second screw 69 and the second sliding block 68 together.

When the side wall of the movable body 3 is relatively thick, the outer end of the second screw 69 may be configured to be aligned with the outer side wall of the movable body 3. When the side wall of the movable body 3 is relatively thin, the outer end of the second screw 69 may be exposed to outside the movable body 3. At this time, the side wall of the fixed body 1 needs to be provided with a fixed body through hole 15 for accommodating an exposed section of the second screw 69, to avoid contact between the second screw 69 and the fixed body 1 when the door hinge is closed.

In addition, since the other end of the first sliding block 67 is provided with a first inclined surface 671, and the first inclined surface 671 may abut against the inner wall of the movable body 3 when the first sliding block 67 slides, therefore, the side wall of the movable body 3 is provided with a movable body through hole 36. When the first sliding block 67 slides toward the end away from the self-closing mechanism 4, the end of the first sliding block having the first inclined surface 671 may penetrate into the movable body through hole 36 to ensure smooth sliding thereof.

In addition, in order to ensure that the first sliding block 67 can only slide along the extending and retracting direction of the energy storage spring 41, a first guide groove 38 is further provided in the movable body 3, and the first guide groove 38 is disposed along the lengthwise direction of the movable body 3, and a side surface of the first sliding block 67 abuts against the side surface of the first guide groove 38. Meanwhile, a second guide groove 39 is further provided in the movable body 3. The second guide groove 39 is disposed along the depth direction of the movable body 3. Both sides of the second sliding block 68 abut against the second guide groove 39 to ensure that the second sliding block 68 can only slide along the depth direction of the movable body 3.

In addition, the difference from the in-line bearing 35 in Embodiment 1 is that, a first bearing 37 is provided between the sliding block 34 and the movable base 33 in this embodiment. Specifically, the side of the sliding block 34 away from the self-closing mechanism 4 is a plane, and a first bearing 37 is provided at a position on the movable base 33 close to the plane, and the outer peripheral surface of the first bearing 37 abuts against the sliding block 34. The axial direction of the first bearing 37 is perpendicular to the sliding direction of the sliding block 34. By providing the first bearing 37, the sliding friction between the sliding block 34 and the movable base 33 is changed to rolling friction, so that the sliding efficiency of the sliding block 34 can be improved. In addition, the structure of the first bearing 37 is simpler than that of the in-line bearing 35, and the first bearing 37 is easy to be mounted and has a better effect of fixing in the movable base 33.

According to some embodiments of the present disclosure, door hinges of the following structures are also provided.

(1) A door hinge, comprising:

a fixed body which is a hollow housing;

a linkage assembly comprising a plurality of linkage blocks for connecting a movable body and the fixed body;

the movable body which is a hollow housing, wherein the movable body is provided with a sliding block which is slidable along a depth direction of the movable body therein, one end of the sliding block is hinged to the linkage assembly, and one side of the sliding block is provided with a straight track surface and an inclined track surface inclined toward a middle of the sliding block; and a self-closing mechanism disposed on one side of the movable body close to the straight track surface, wherein the self-closing mechanism has a telescopic structure which can extend and retract along a lengthwise direction of the movable body, wherein one end of the self-closing mechanism abuts against a side surface of the sliding block, and wherein the sliding block is driven to slide toward an inside of the movable body when the end of the self-closing mechanism abuts against the inclined track surface and extends.

(2) The door hinge according to (1), wherein the fixed body is provided with a first connecting shaft and a second connecting shaft along a lengthwise direction therein, wherein the linkage assembly comprises a first linkage block, a second linkage block, a third linkage block and a fourth linkage block, wherein one end of the first linkage block and one end of the second linkage block are hinged to the first connecting shaft, and another end of the first linkage block and the other end of the second linkage block are hinged to one end of the third linkage block, wherein another end of the third linkage block is hinged to the movable body, and a middle of the third linkage block is provided with an opening through which the fourth linkage block penetrates, and wherein one end of the fourth linkage block is hinged to the second connecting shaft, a middle portion of the fourth linkage block is hinged in the opening of the third linkage block, and another end of the fourth linkage block is hinged to the sliding block.

(3) The door hinge according to (1), wherein the self-closing mechanism comprises:

an energy storage spring disposed along the lengthwise direction of the movable body and having one end connected to an inner wall of the movable body and another end provided with a spring sliding block; and the spring sliding block having a second bearing hinged and disposed at one end thereof away from the energy storage spring, wherein the second bearing abuts against the side surface of the sliding block.

(4) The door hinge according to (3), wherein an adjustment mechanism is disposed between the energy storage spring and the inner wall of the movable body to adjust a distance between the end of the energy storage spring and the inner wall of the movable body, wherein the adjustment mechanism comprises:

a spring top block having one end connected to the end of the energy storage spring, and another end fixedly connected with a first screw;

a worm gear connected to the first screw in manner of thread;

a worm screw hinged to the movable body and engaged with the worm gear to drive the worm gear to rotate; and a fixing block which has a hollow cylindrical structure and disposed in an inner wall at an end of the movable body, wherein one end of the first screw penetrates into the fixing block, and an end surface of the worm gear abuts against an end surface of the fixing block.

(5) The door hinge according to (4), wherein the worm screw has one end penetrating through a side wall of the movable body and an outer end provided with a buckle for limiting displacement of the worm screw along a lengthwise direction thereof (6) The door hinge according to (3), wherein an adjustment mechanism is disposed between the energy storage spring and the inner wall of the movable body to adjust a distance between the end of the energy storage spring and the inner wall of the movable body, wherein the adjustment mechanism comprises:

a first sliding block slidably assembled in the movable body and slidable along an extending and retracting direction of the self-closing mechanism, wherein the first sliding block has one end connected to the self-closing mechanism and another end provided with a first inclined surface;

a second sliding block slidably assembled in the movable body and slidable along a direction perpendicular to the extending and retracting direction of the self-closing mechanism, wherein a side surface of the second sliding block has a second inclined surface abutting against the first inclined surface; and a second screw connected to a side wall of the movable body in manner of thread and having one end rotatably connected to one end of the second sliding block away from the first sliding block.

(7) The door hinge according to (6), wherein one end of the second screw is provided with a connecting portion, and wherein one end of the second sliding block is provided with a limiting groove for accommodating the connecting portion, wherein the connecting portion is caught in the limiting groove and is rotatable around an axial direction of the second screw.

(8) The door hinge according to (6), wherein a side wall of the fixed body is provided with a fixed body through hole for accommodating an exposed section of the second screw, and wherein the side wall of the movable body is provided with a movable body through hole in which the end of the first sliding block slides.

(9) The door hinge according to (6), wherein the movable body is provided with a first guide groove in which the first sliding block slides along the extending and retracting direction of the energy storage spring therein, and wherein the movable body is provided with a second guide groove in which the second sliding block slides therein.

(10) The door hinge according to (1), wherein the movable body is provided with a buffer mechanism for controlling a closing speed of the door hinge therein, wherein the buffer mechanism comprises:

a top plate detachably connected to a side wall of the movable body;

a damper having one end fixedly connected to the top plate and another end which is an extensible and retractable end; and a damping sliding block slidably assembled in the movable body and slidable along a depth direction of the movable body, wherein the damping sliding block has one end abutting against the extensible and retractable end of the damper and another end provided with a top block protruding outward.

(11) The door hinge according to (10), wherein the movable body comprises a movable base, a first fixing block of the movable base and a second fixing block of the movable base, among which a cavity is formed to accommodate the sliding block, the self-closing mechanism and the buffer mechanism.

(12) The door hinge according to (10), wherein the fixed body comprises a fixed base and a fixed base fixing block, wherein the fixed base and the fixed base fixing block are detachably connected to each other.

(13) The door hinge according to (12), wherein the fixed base fixing block is provided with a protrusion facing the top block.

(14) The door hinge according to (1), wherein the inclined track surface comprises a first inclined track surface and a second inclined track surface arranged in sequence, wherein an angle between the first inclined track surface and the straight track surface is $\alpha_1$, and an angle between the second inclined track surface and the straight track surface is $\alpha_2$, and $\alpha_1 < \alpha_2$.

(15) The door hinge according to (14), wherein $9° \leq \alpha_1 < 45°$ and $24° \leq \alpha_2 \leq 45°$.

According to some embodiments of the present disclosure, all or part of the following advantages can be achieved.

1. In the door hinge according to some embodiments of the present disclosure, the fixed body and the movable body thereof may be respectively arranged in the door frame and the door, to realize the concealed mounting of the hinge. In addition, a self-closing mechanism is disposed in the door hinge, and after the angle of the door hinge reaches a certain angle when the door is being closed, the door hinge can be closed automatically, to achieve both the function of automatic closing and the function of concealed mounting.

2. The door hinge according to some embodiments of the present disclosure is internally provided with an adjustment mechanism for adjusting the magnitude of the power of the self-closing mechanism. When the door hinge is mounted on different doors, the magnitude of the power of the self-closing mechanism can be adjusted according to the weight of the door, thereby the door hinge can adapt to a variety of specifications of doors.

3. The door hinge according to some embodiments of the present disclosure is further provided with a buffer mechanism, which can effectively reduce the closing speed when the door hinge is being closed, thereby reducing the noise in the process of closing the door.

It will be apparent to those skilled in the art that the present disclosure is not limited to the details of the above-described exemplary embodiments, but that the present disclosure can be embodied in other specific forms without departing from the spirit or essential characteristics of the present disclosure. Therefore, the embodiments should be considered exemplary and not restrictive in all points of view, and the scope of the present disclosure is defined by the appended claims rather than the foregoing description, and it is intended that the scope of the present disclosure be defined by the appended claims rather than by the foregoing description. All modifications falling within the concepts and scope of equivalents of the claims are embraced in this disclosure. Any reference number in claims should not be construed as limiting the claims concerned.

INDUSTRIAL APPLICABILITY

The door hinge of the present disclosure solves the problem that the conventional door hinge cannot have both the concealed mounting function and the automatic closing function, and the door hinge of the present disclosure is suitable for industrial applications.

What is claimed is:

1. A door hinge, comprising:

a fixed body which is a hollow housing;

a linkage assembly comprising a plurality of linkage blocks for connecting a movable body and the fixed body;

the movable body which is a hollow housing having an inside space, wherein the movable body has a lengthwise direction, a crosswise direction and a depth direction perpendicular to one another and the depth direction extends into the inside space and, wherein the movable body is provided with a sliding block which is slidable along the depth direction of the movable body, the sliding block has one side hinged to the linkage assembly, and the other side provided with a side surface including a straight track surface and an inclined track surface inclined toward a middle of the sliding block; and a self-closing mechanism disposed on one side of the movable body close to the straight track surface, wherein the self-closing mechanism has a telescopic structure which can extend and retract along the lengthwise direction of the movable body, one end of the self-closing mechanism abuts against the side surface of the sliding block, and the self-closing mechanism is configured to drive the sliding block to slide in the depth direction toward the inside space of the movable body when the end of the self-closing mechanism abuts against the inclined track surface and extends.

2. The door hinge according to claim 1, wherein the fixed body is provided with a first connecting shaft and a second connecting shaft along a lengthwise direction therein, wherein the linkage assembly comprises a first linkage block, a second linkage block, a third linkage block and a fourth linkage block, wherein one end of the first linkage block and one end of the second linkage block are hinged to the first connecting shaft, and another end of the first linkage block and the other end of the second linkage block are hinged to one end of the third linkage block, wherein another end of the third linkage block is hinged to the movable body, and a middle of the third linkage block is provided with an opening through which the fourth linkage block penetrates, and wherein one end of the fourth linkage block is hinged to the second connecting shaft, a middle portion of the fourth linkage block is hinged in the opening of the third linkage block, and another end of the fourth linkage block is hinged to the sliding block.

3. The door hinge according to claim 1, wherein the self-closing mechanism comprises:

an energy storage spring disposed along the lengthwise direction of the movable body and having one end connected to an inner wall of the movable body and another end provided with a spring sliding block; and the spring sliding block having a first bearing hinged and disposed at one end thereof away from the energy storage spring, wherein the first bearing abuts against the side surface of the sliding block.

4. The door hinge according to claim 3, wherein an adjustment mechanism is disposed between the energy storage spring and the inner wall of the movable body to adjust a distance between an end of the energy storage spring and the inner wall of the movable body, wherein the adjustment mechanism comprises:

a spring top block having one end connected to the end of the energy storage spring, and another end fixedly connected with a first screw;

a worm gear connected with the first screw in manner of thread;

a worm screw connected to the movable body and engaged with the worm gear to drive the worm gear to rotate; and a fixing block which has a hollow cylindrical structure and disposed in an inner wall at an end of the movable body, wherein one end of the first screw penetrates into the fixing block, and an end surface of the worm gear abuts against an end surface of the fixing block.

5. The door hinge according to claim 4, wherein the worm screw has one end penetrating through a side wall of the movable body and an outer end provided with a buckle for limiting displacement of the worm screw along a lengthwise direction thereof.

6. The door hinge according to claim 3, wherein an adjustment mechanism is disposed between the energy storage spring and the inner wall of the movable body to adjust a distance between the end of the energy storage spring and the inner wall of the movable body, wherein the adjustment mechanism comprises:

a first sliding block slidably assembled in the movable body and slidable along an extending and retracting direction of the self-closing mechanism, wherein the first sliding block has one end connected to the self-closing mechanism and another end provided with a first inclined surface;

a second sliding block slidably assembled in the movable body and slidable along a direction perpendicular to the extending and retracting direction of the self-closing mechanism, wherein a side surface of the second sliding block has a second inclined surface abutting against the first inclined surface; and a first screw connected to a side wall of the movable body in manner of thread and having one end rotatably connected to one end of the second sliding block away from the first sliding block.

7. The door hinge according to claim 6, wherein one end of the first screw is provided with a connecting portion, and wherein one end of the second sliding block is provided with a limiting groove for accommodating the connecting portion, and the connecting portion is caught in the limiting groove and is rotatable around an axial direction of the first screw.

8. The door hinge according to claim 6, wherein a side wall of the fixed body is provided with a fixed body through hole for accommodating an exposed section of the first screw, and wherein the side wall of the movable body is provided with a movable body through hole in which the end of the first sliding block slides.

9. The door hinge according to claim 6, wherein the movable body is provided with a first guide groove in which the first sliding block slides along the extending and retracting direction of the energy storage spring therein, and wherein the movable body is provided with a second guide groove in which the second sliding block slides therein.

10. The door hinge according to claim 1, wherein the movable body is provided with a buffer mechanism for controlling a closing speed of the door hinge therein, wherein the buffer mechanism comprises:

a top plate detachably connected to a side wall of the movable body;

a damper having one end fixedly connected to the top plate and another end which is an extensible and retractable end; and a damping sliding block slidably assembled in the movable body and slidable along a depth direction of the movable body, wherein the damping sliding block has one end abutting against the extensible and retractable end of the damper and another end provided with a top block protruding outward.

11. The door hinge according to claim 10, wherein the movable body comprises a movable base, a first fixing block of the movable base and a second fixing block of the movable base, among which a cavity is formed to accommodate the sliding block, the self-closing mechanism and the buffer mechanism.

12. The door hinge according to claim 10, wherein the fixed body comprises a fixed base and a fixed base fixing block, wherein the fixed base and the fixed base fixing block are detachably connected to each other.

13. The door hinge according to claim 12, wherein the fixed base fixing block is provided with a protrusion facing the top block.

14. The door hinge according to claim 1, wherein the inclined track surface comprises a first inclined track surface and a second inclined track surface arranged in sequence, wherein an angle between the first inclined track surface and the straight track surface is $\alpha 1$, and an angle between the second inclined track surface and the straight track surface is $\alpha 2$, and $\alpha 1 < \alpha 2$.

15. The door hinge according to claim 14, wherein $9° \leq \alpha 1 < 45°$ and $24° \leq \alpha 2 \leq 45°$.

* * * * *